US011994203B2

(12) United States Patent
Nickel

(10) Patent No.: US 11,994,203 B2
(45) Date of Patent: May 28, 2024

(54) HOUSING PART HAVING A SERVICE ACCESS

(71) Applicant: ZF FRIEDRICHSHAFEN AG, Friedrichshafen (DE)

(72) Inventor: Robert Nickel, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 18/163,512

(22) Filed: Feb. 2, 2023

(65) Prior Publication Data
US 2023/0250867 A1 Aug. 10, 2023

(30) Foreign Application Priority Data

Feb. 8, 2022 (DE) ................. 10 2022 201 260.7

(51) Int. Cl.
*F16H 57/029* (2012.01)
*F16H 57/031* (2012.01)
*F16H 57/02* (2012.01)

(52) U.S. Cl.
CPC ......... *F16H 57/031* (2013.01); *F16H 57/029* (2013.01); *F16H 2057/02034* (2013.01); *F16H 2057/02043* (2013.01)

(58) Field of Classification Search
CPC .................. F16H 57/029; H02K 5/225
See application file for complete search history.

(56) References Cited

U.S. PATENT DOCUMENTS

| 6,664,678 | B2* | 12/2003 | Shimizu | H01R 13/521 |
| | | | | 310/71 |
| 7,002,271 | B2* | 2/2006 | Reed | H02K 3/50 |
| | | | | 310/71 |
| 8,136,623 | B2* | 3/2012 | Takashima | H02K 5/225 |
| | | | | 310/68 B |
| 9,431,867 | B2* | 8/2016 | Tamura | H02K 5/225 |
| 9,806,436 | B2* | 10/2017 | Takahashi | H01R 4/70 |
| 2009/0267430 | A1 | 10/2009 | Imamura et al. | |
| 2014/0062234 | A1* | 3/2014 | Tamura | H02K 5/225 |
| | | | | 310/71 |

FOREIGN PATENT DOCUMENTS

DE 3417010 11/1985
DE 102008018477 6/2009
(Continued)

OTHER PUBLICATIONS

Office Action of corresponding German Patent Application No. 10 2022 201 260.7.

*Primary Examiner* — Thomas C Diaz
(74) *Attorney, Agent, or Firm* — Cozen O'Connor

(57) ABSTRACT

A housing part and drive system for a vehicle, including a housing part, having a service access for the actuation of at least one screw that is arranged in the interior of a housing assigned to the housing part. The housing part has an insert is fitted into a provided opening and in which at least one receiving slot is provided, which at least one receiving slot is open at an inner end and advantageously projects over a screw head of one of the at least one screw and is closed at an outer end by a detachable sealing plug. The receiving slot is advantageously dimensioned so as to serve as a guide for a screwdriver.

13 Claims, 4 Drawing Sheets

(56) References Cited

FOREIGN PATENT DOCUMENTS

| | | |
|---|---|---|
| DE | 112015006071 | 10/2017 |
| DE | 102016118163 | 3/2018 |
| DE | 102018217942 | 4/2020 |
| DE | 102019207042 | 11/2020 |
| DE | 102019122805 | 3/2021 |
| DE | 102019212980 | 3/2021 |
| JP | 2014169079 | 9/2014 |

* cited by examiner

HOUSING PART HAVING A SERVICE ACCESS

BACKGROUND OF INVENTION

1. Field of the Invention

The disclosure relates to a housing part having a service access, and to a drive system for a vehicle having a clutch housing, of which a sub-region constitutes the housing part.

2. Description of Related Art

For the open-loop and closed-loop control of electric motors, power electronics connected to the electric motor are required. In the case of drive systems for motor vehicles, for example, the power electronics are accommodated in a separate electronics block that is mechanically detachably connected to a transmission block containing the electric motor in order to enable the electronics block to be removed from the transmission block for servicing purposes or in order to be exchanged. Prior to mechanical separation, the electrical interfaces of the power electronics and of the electric motor must be detached from one another.

For the design of the electrical interfaces between the power electronics and the electric motor, the prior art has disclosed numerous solutions, which satisfy different requirements. Here, the most energy-efficient and technically most easily implementable interface design is always achieved if the conductors leading from the electric motor are connected directly in force-fitting fashion, by screw connections, to the conductors leading from the power electronics. In order for the screw connections to be released, these must be accessible to the technician. Finding a practicable solution for this, which does not necessitate extensive dismounting of housing parts, is of secondary importance in the design of drive systems because greater weighting is given to numerous other features and parameters of the drive system. That is to say, the location at which the electrical interfaces are arranged within a housing is primarily not determined with regard to their being easily accessible.

Within a housing, the screw connections assume a fixed relative position with respect to a housing wall. This relative position, hereinafter referred to as service location, could in principle be arranged relative to a housing wall such that the technician can conveniently actuate the screws of the screw connection at the service location, using a screwdriver, through a service access provided in the housing wall. It is known from practice to create a service access through the provision of an opening in the housing wall opposite the service location, which opening is closed by a cover and is opened in the event of servicing for the purposes of actuating the screws. Here, it is assumed not only that the technician can guide their screwdriver through the opening in unimpeded fashion, but also that said technician can see the screws, and counterparts provided with a threaded bore, during the actuation. Said technician must be able to cleanly engage the screwdriver on the screw head, in particular in order to avoid a situation in which the screw falls off the screwdriver in an undesired manner and possibly falls into the interior of the housing. This risk however cannot be ruled out even if such a service access is easily accessible to the user, for which reason a service access is often not provided in practice. To reach the service location, it is then necessary for a part of the housing to be removed, which can involve great effort in particular in the case of complex drive systems.

One practical example of this is the drive system of a motor vehicle with a hybrid drive. This substantially includes a transmission block with a transmission housing, comprising a transmission and an electric motor, an electronics block, a combustion engine, a clutch by which the output shaft of the combustion engine is connected to the drive shaft of the transmission, and a clutch housing, which encloses the clutch. The clutch housing is connected at one side to the transmission housing and at the other side via a motor flange to the combustion engine. If the technician views the transmission block in the direction of the drive shaft when the clutch housing is installed, the motor flange on the clutch housing almost completely conceals the transmission block. This means that even an electrical service location as described above, which is arranged in the transmission block, is situated behind a housing region that is concealed by the motor flange. The mechanical interface between the transmission housing and the clutch housing is designed to be at the periphery of the transmission block, whereby the transmission block is, on a side facing toward the clutch, covered not by the transmission housing but by a sub-region of the clutch housing.

With the removal of the clutch housing from the transmission housing, that side of the transmission block which faces toward the clutch is then opened, and the electrical interface is thus also accessible. To avoid the dismounting effort for this, a suitable service access should be created in the sub-region of the clutch housing.

It to be noted here that, although sufficient space is available between the motor flange and the transmission block to reach the screws of the electrical interface through a service access using a screwdriver, the space is not sufficient for the technician, with their head between said motor flange and transmission block, to view the screws frontally through the service access, and said technician must therefore perform so-called blind installation in order, by screwing in or unscrewing the screws, to release or produce the connection between the electrical conductors of the power electronics and the electrical conductors of the motor.

Even if the electrical interface and accordingly the service access were arranged and designed such that the technician can view the screws frontally through said service access, it can occur that a screw, after being released or before being screwed into the threaded bore of a counterpart, falls off the screwdriver and disappears into the interior of the housing.

SUMMARY OF THE INVENTION

It is an object of one aspect of the invention to create a housing part having a service access through which reliable blind installation of a screw is possible.

One aspect of the invention is a housing part having a service access for the actuation of at least one screw which is arranged in the interior of a housing assigned to the housing part with a fixed relative position with respect to the service access, which housing includes an opening present in the housing part. The housing part comprises an inwardly directed shoulder, which encloses the opening and which has an inner lateral surface, and an insert, which has an outer lateral surface correlating with the inner lateral surface and which is inserted into and connected to the shoulder. The inner lateral surface and the outer lateral surface are sealed off with respect to one another by a seal. It is essential to the invention that at least one receiving slot for the actuation of in each case one screw is present in the insert, which at least one receiving slot is open at an inner end and is closed at an outer end by a detachable sealing plug.

The shoulder advantageously has at least two end surfaces that lie orthogonally with respect to the inner lateral surface and in one plane and to which the insert is fastened in an abutting manner.

It is advantageous if the at least one receiving slot has a rotationally symmetrical peripheral surface with a cylindrical portion toward the outer end.

It is particularly advantageous if the cylindrical portion is dimensioned so as to serve as a guide for a screwdriver.

For some applications, it is advantageous that the rotationally symmetrical peripheral surface has a further cylindrical portion toward the inner end, with a further diameter which is greater than the diameter of the cylindrical portion toward the outer end.

For other applications, it is advantageous that the rotationally symmetrical peripheral surface has a conically tapering portion toward the inner end.

It is also favorable that the portions of the rotationally symmetrical peripheral surface are connected to one another via convex portions.

It is in many cases advantageous for the insert to be produced from plastics material.

For the opening and closing of the at least one receiving slot, it is advantageous that the sealing plug is sealed off with respect to the insert by a peripheral seal in the at least one receiving slot.

The housing part according to one aspect of the invention is advantageously a sub-region of a clutch housing of a drive system for a vehicle.

A drive system for a vehicle, having a transmission block that is housed by a transmission housing and a clutch housing, advantageously has a sub-region which constitutes a housing part according to the invention, an electrical interface at which at least one screw connection with the screw is arranged being provided within the transmission block.

The at least one screw advantageously projects into the at least one receiving slot.

The electrical interface advantageously has exactly three screw connections, each of which is assigned a receiving slot.

It is furthermore advantageous for the service access 2 to be arranged at a distance in the range of 3 cm to 15 cm from a motor flange 36.

BRIEF DESCRIPTION OF THE DRAWINGS

The invention will be discussed in more detail below on the basis of an exemplary embodiment and with reference to drawings, in which.

DETAILED DESCRIPTION OF THE PRESENTLY PREFERRED EMBODIMENTS

Figure 1:
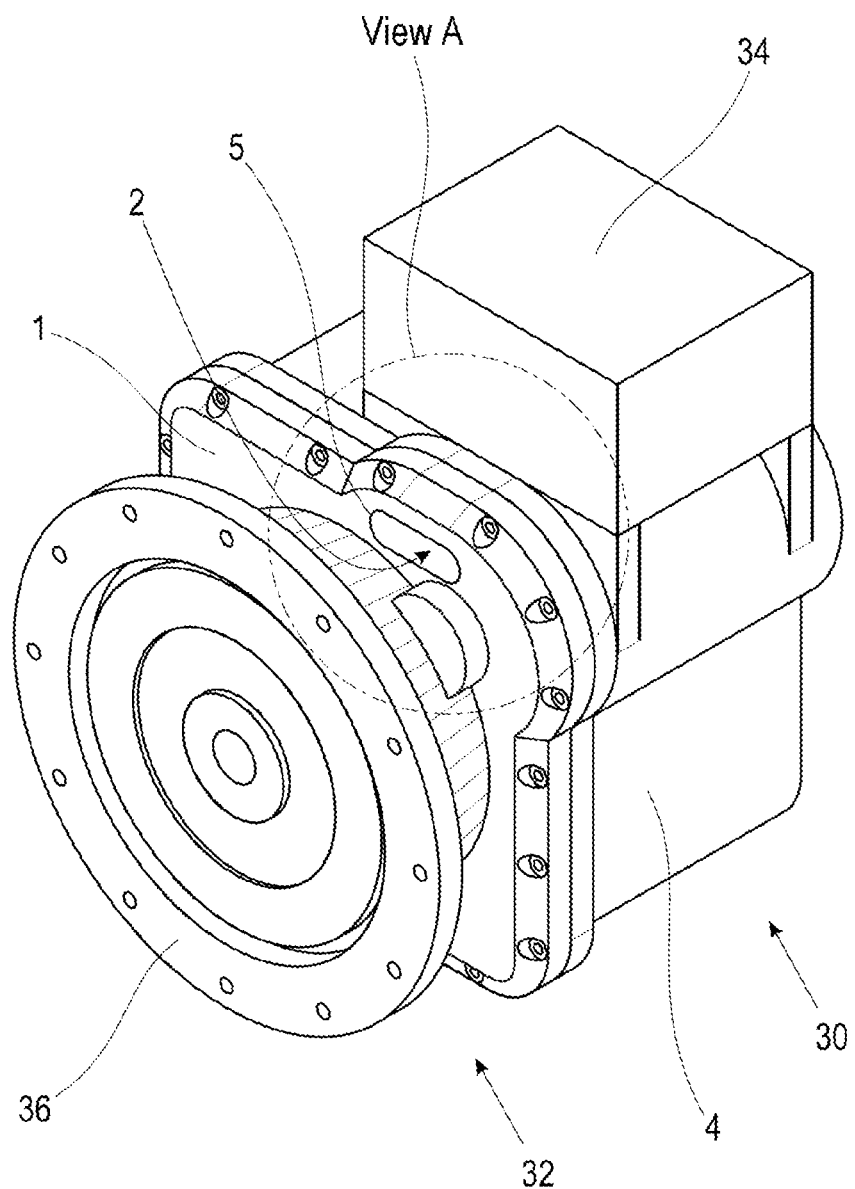
FIG. 1 is a schematic illustration of a part of a drive system of a vehicle having a housing part with service access, wherein the housing part is a sub-region of a clutch housing.

FIG. 1 schematically illustrates a part of a drive system for a vehicle, in which a housing part 1 according to one aspect of the invention having a service access 2 is advantageously used. The illustrated part of the drive system comprises a transmission block 30, on which an electronics block 34 is arranged. The transmission block 30 is housed by a housing 4 and by a sub-region of the clutch housing 32. The respective sub-region of the clutch housing 32 constitutes the housing part 1 here. As can be seen in the drawing, a motor flange 36, which is provided for the installation of a combustion engine and which delimits the clutch housing 32, projects radially beyond the service access 2. Since there is also only a small distance between the motor flange 36 and the service access 2, it is not possible for a technician to view the service access 2 frontally.

Figure 4:
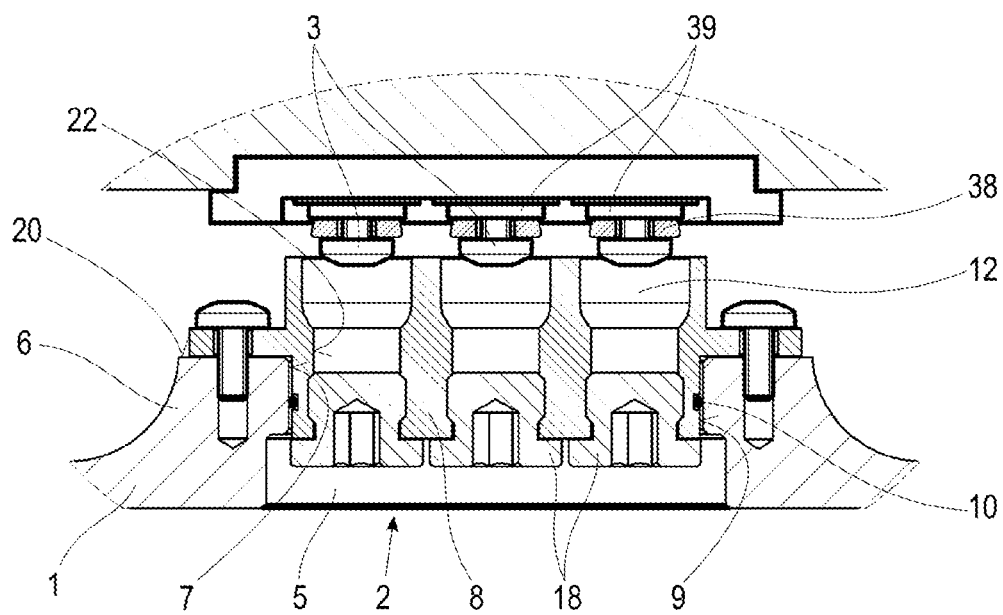
FIG. 4 is a sectional illustration of a first embodiment of a service access.

Power electronics provided in the electronics block 34 are connected, via an electrical interface arranged in the interior of the transmission block 30, to an electric motor that is provided in the transmission block 30 The electrical interface is formed by the electrical lines 38 leading from the power electronics and further electrical lines 39 leading from the electric motor, see FIG. 4, which are connected to one another by at least one screw connection. To actuate a screw 3 of such a screw connection, the technician can engage the screw 3 using a screwdriver through the service access 2.

Figure 2:
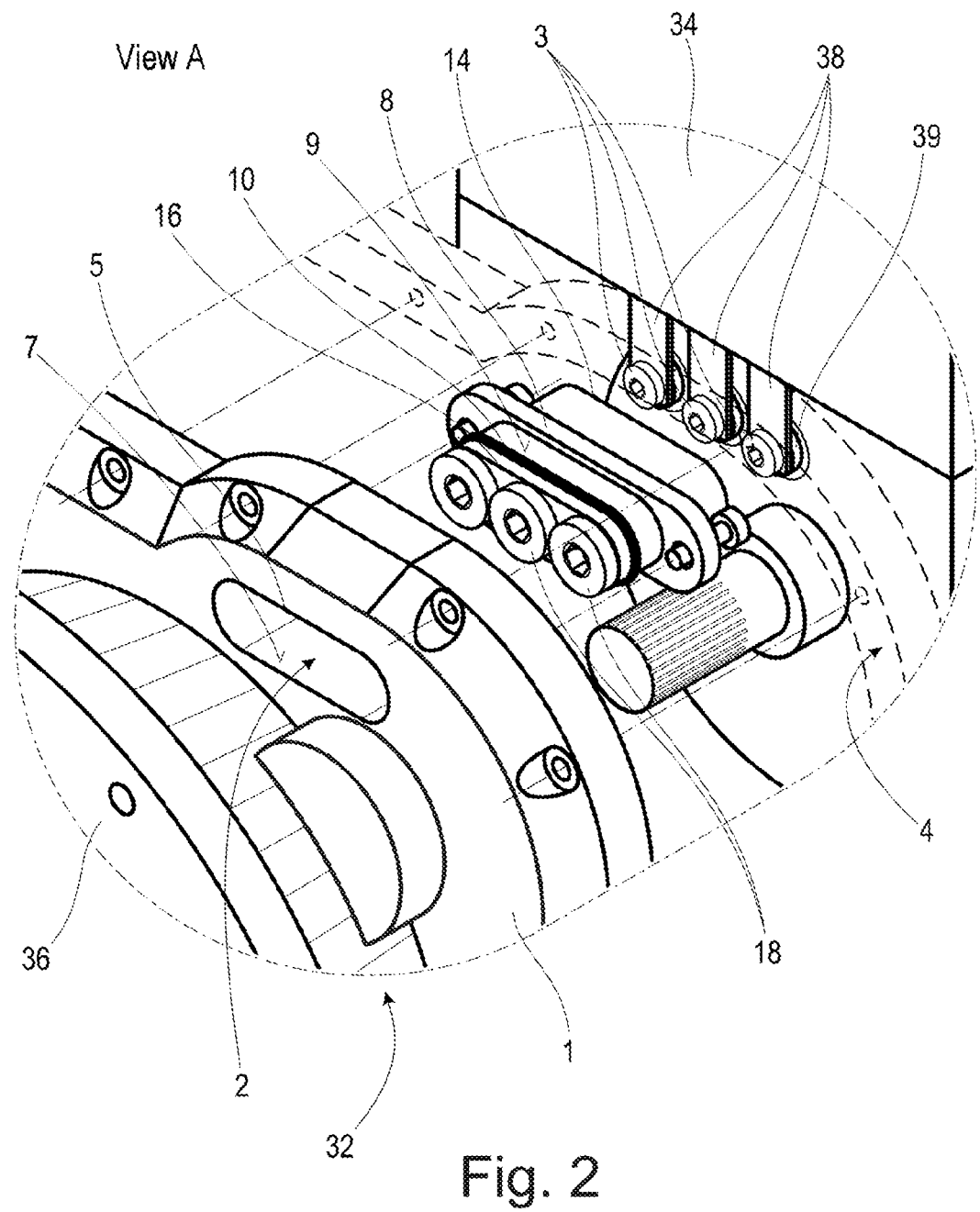
FIG. 2 is a detail view of the part of the drive system as per FIG. 1 in an exploded illustration, viewed from outside the housing part.
Figure 3:
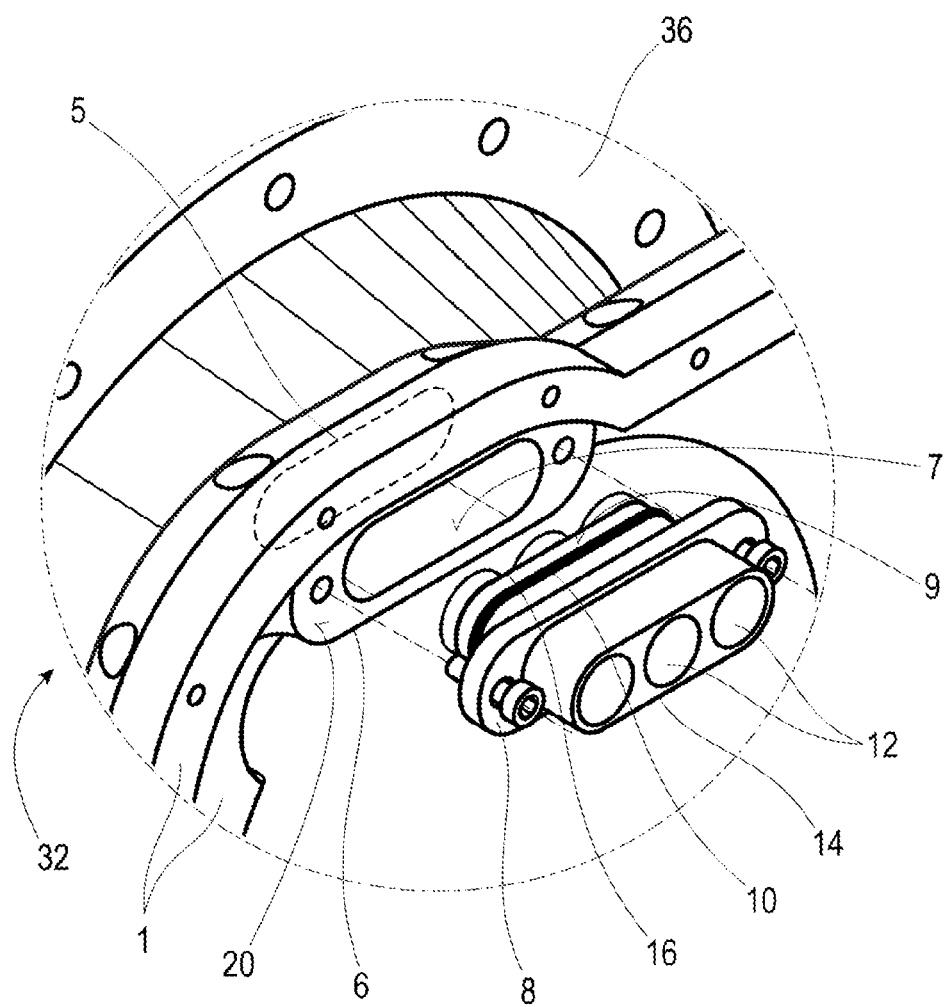
FIG. 3 is a detail view of the part of the drive system as per FIG. 1 in an exploded illustration, viewed from inside the housing part.

As can be clearly seen in particular from FIG. 2 and FIG. 3, the service access 2 that is provided in the housing part 1 has, for the installation of an insert 8, a shoulder 6 which, directed into the interior of the housing 4 assigned to the housing part 1, has an opening 5. The shoulder 6 extends inward to such an extent that an insert 8 inserted into said shoulder 6 does not project beyond an outer surface, adjacent to the opening 5, of the housing part 1, see FIG. 4. Thus, installation freedom that exists without the service access 2 is not restricted by this. The service access 2 is, in the installed state, arranged at a distance in the range of 3 cm to 15 cm from the motor flange 36.

The shoulder 6 has an inner lateral surface 7, correlating with an outer lateral surface 9 of the insert 8, wherein the inner lateral surface 7 and the outer lateral surface 9 are sealed off with respect to one another by a seal 10.

The insert 8 is fixedly connected to the shoulder 6. For this purpose, the shoulder 6 advantageously has at least two end surfaces 20 that lie orthogonally with respect to the inner lateral surface 7 and in one plane and to which the insert 8 is fastened in an abutting manner.

It is essential to the invention that at least one receiving slot 12 for the actuation of in each case one screw 3 is present in the insert 8, which at least one receiving slot is open at an inner end 14 and is closed at an outer end 16 by a detachable sealing plug 18, as can be clearly seen in the sectional image in FIG. 4. Here, the sealing plug 18 is sealed off with respect to the insert 8 by a flat seal on the outer end 16 or by a peripheral seal on the peripheral surface 22.

The at least one receiving slot 12 advantageously has a rotationally symmetrical peripheral surface 22 with a cylindrical portion toward the outer end 16. Said cylindrical portion advantageously has an internal thread into which the sealing plug 18 is screwed. Said cylindrical portion is particularly advantageously dimensioned so as to serve as a guide for a screwdriver. This means that a screwdriver inserted into the receiving slot 12 is directed to the associated screw 3 so as to reliably engage into the screw head of the screw 3. A hexagonal socket is advantageously formed on the screw head. In particular if a screwdriver with magnetic holding action is used, a larger contact surface that is provided by a hexagonal socket in relation to a slot is advantageous.

Toward the inner end 14, different embodiments of the rotationally symmetrical peripheral surface 22 are advantageous.

A further cylindrical portion with a further diameter that is greater than the diameter of the cylindrical portion adjoining the outer end 16, as shown in FIG. 4, has the advantage that, if the screw 3 falls off the screwdriver, said screw remains in the further cylindrical portion.

Figure 5:
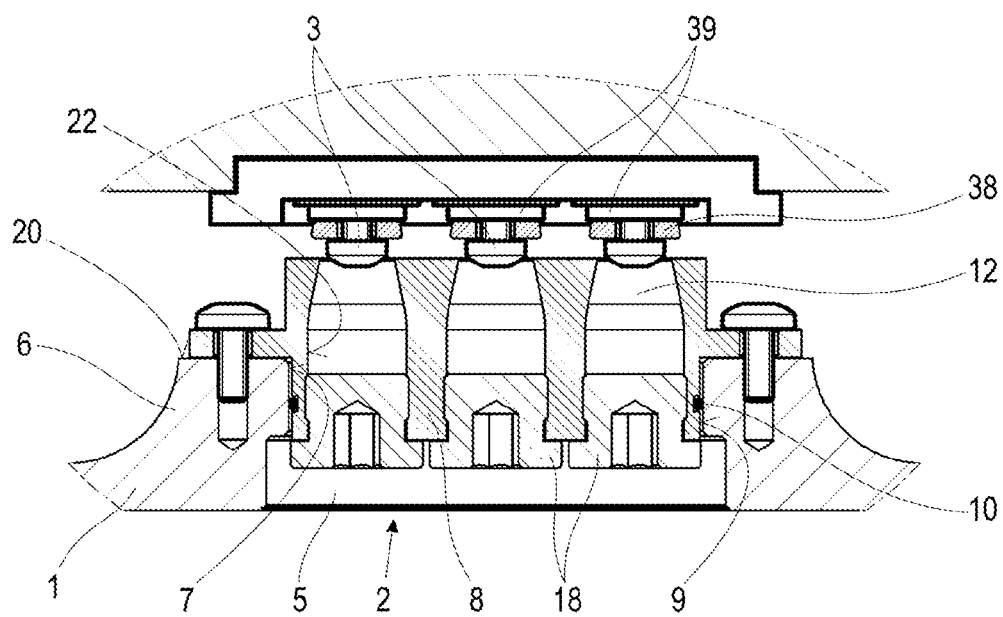
FIG. 5 is a sectional illustration of a second embodiment of a service access.

Instead, it may be advantageous if, as illustrated in FIG. 5, the rotationally symmetrical peripheral surface 22 has a conically tapering portion toward the inner end 14. The screw 3 would then tend to slide in the direction of the outer end 16.

By virtue of the portions of the rotationally symmetrical peripheral surface being connected to one another via convex portions, jamming in the event that a screw that has fallen off the screwdriver has to be removed from the receiving slot 12 can be prevented.

A service access 2 according to one aspect of the invention is highly suitable for being designed for an electrical interface with one, typically three or even more connections.

For the specific use of a housing part 1 having a service slot 2 in the case of which the housing part 1 is formed by a clutch housing 32, more specifically a sub-region of the clutch housing 32, the service slot has numerous advantages.

Machining of the shoulder 6, for example in order to manufacture the sealing surfaces, can be performed from the inside of the housing part 1, such that the motor flange 36 does not pose an obstruction here.

Likewise, the service access (service slot) 2 is designed such that, during the installation thereof, the insert 8 is inserted into the shoulder from the inside of the housing part 1, for which, again, the motor flange (see FIG. 1) does not pose an obstruction.

Owing to the provided sealing of the insert 8 with respect to the shoulder 6, and of the sealing plug 18 with respect to the at least one receiving slot 12, the interior of the housing 4 is sealed off with respect to the surroundings.

To release the screw 3 that fixes the at least one electrical interface, it is no longer necessary for the entire clutch housing 32 to be unscrewed if it is intended to detach the electronics block 34 from the transmission block 30.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A housing part having a service access configured to provide access for actuation of at least one screw arranged in an interior of a housing assigned to the housing part with a fixed relative position with respect to the service access, comprising:
   an opening defined in the housing part;
   a shoulder of the housing part that is inwardly directed and encloses the opening and which has an inner lateral surface;
   an insert having an outer lateral surface correlating with the inner lateral surface and which is inserted into and connected to the shoulder;
   a seal configured to seal off the inner lateral surface and the outer lateral surface being sealed off with respect to one another;
   at least one receiving slot arranged in the insert and configured for the actuation of the at least one screw, the at least one receiving slot is open at an inner end; and
   a detachable sealing plug configured to close an outer end of the at least one receiving slot,
   wherein the shoulder has at least two end surfaces which lie orthogonally with respect to the inner lateral surface and in one plane and to which the insert it is fastened in an abutting manner, and
   wherein an inner end of the at least one receiving slot is spaced apart from and faces the at least one screw so that only a portion of a screw head of the at least one screw projects into the at least one receiving slot.

2. The housing part having the service access as claimed in claim 1, wherein the at least one receiving slot has a rotationally symmetrical peripheral surface with a cylindrical portion toward the outer end.

3. The housing part having the service access as claimed in claim 2, wherein the cylindrical portion is dimensioned so as to serve as a guide for a screwdriver.

4. A housing part having a service access configured to provide access for actuation of at least one screw arranged in an interior of a housing assigned to the housing part with a fixed relative position with respect to the service access, comprising:
   an opening defined in the housing part;
   a shoulder of the housing part that is inwardly directed and encloses the opening and which has an inner lateral surface;
   an insert having an outer lateral surface correlating with the inner lateral surface and which is inserted into and connected to the shoulder;
   a seal configured to seal off the inner lateral surface and the outer lateral surface being sealed off with respect to one another;
   at least one receiving slot arranged in the insert and configured for the actuation of the at least one screw, the at least one receiving slot is open at an inner end; and
   a detachable sealing plug configured to close an outer end of the at least one receiving slot,
   wherein the rotationally symmetrical peripheral surface has a further cylindrical portion toward the inner end, with a further diameter which is greater than a diameter of the cylindrical portion toward the outer end.

5. The housing part having the service access as claimed in claim 2, wherein the rotationally symmetrical peripheral surface has a conically tapering portion toward the inner end.

6. The housing part having the service access as claimed in claim 4, wherein portions of the rotationally symmetrical peripheral surface are connected to one another via convex portions.

7. The housing part having the service access as claimed in a claim 1, wherein the insert is composed of plastics material.

8. The housing part having the service access as claimed in claim 1, wherein the detachable sealing plug is sealed off with respect to the insert by a peripheral seal in the at least one receiving slot.

9. The housing part having the service access as claimed in claim 1, wherein the housing part is a sub-region of a clutch housing of a drive system for a vehicle.

10. The housing part having the service access as claimed in claim 5, wherein portions of the rotationally symmetrical peripheral surface are connected to one another via convex portions.

11. A drive system for a vehicle, comprising:
a transmission block that is housed by a transmission housing and a sub-region of a clutch housing is a housing part having a service access configured to provide access for actuation of at least one screw arranged in an interior of the transmission housing assigned to the housing part with a fixed relative position with respect to the service access, comprising:
an opening defined in the housing part;
an inwardly directed shoulder of the housing part that encloses the opening and which has an inner lateral surface;
an insert having an outer lateral surface correlating with the inner lateral surface and which is inserted into and connected to the shoulder;
a seal configured to seal off the inner lateral surface and the outer lateral surface being sealed off with respect to one another;
at least one receiving slot arranged in the insert and configured for the actuation of the at least one screw, the at least one receiving slot is open at an inner end;
a detachable sealing plug configured to close the at least one receiving slot at an outer end; and
an electrical interface at which at least one screw connection with the at least one screw is arranged being provided within the transmission block,
wherein the at least one screw projects into the at least one receiving slot,
wherein the service access is arranged at a distance in a range of 3 cm to 15 cm from a motor flange.

12. The housing part having the service access as claimed in claim 1, wherein the outer end of the at least one receiving slot is offset from an outer surface of the slot.

13. The housing part having the service access as claimed in claim 1, wherein an outer surface of the detachable sealing plug is flush with the housing part.

* * * * *